April 5, 1966 A. K. SCHWERIN ETAL 3,244,518

PROCESS FOR OBTAINING MULTICOLOR IMAGES AND A MULTILAYER SHEET FOR USE THEREIN

Filed May 19, 1960

ANDRE K. SCHWERIN
DEWEY M. DUMERS
INVENTORS.

BY Henry W Coughlin
Edward P Gilheany
ATTORNEYS.

United States Patent Office 3,244,518

Patented Apr. 5, 1966

3,244,518

PROCESS FOR OBTAINING MULTICOLOR IMAGES AND A MULTILAYER SHEET FOR USE THEREIN

Andre K. Schwerin and Dewey M. Dumers, Binghamton, N.Y., assignors to General Aniline & Film Corporation, New York, N.Y., a corporation of Delaware Filed May 19, 1960, Ser. No. 30,245
16 Claims. (Cl. 96—2)

Figure 1:
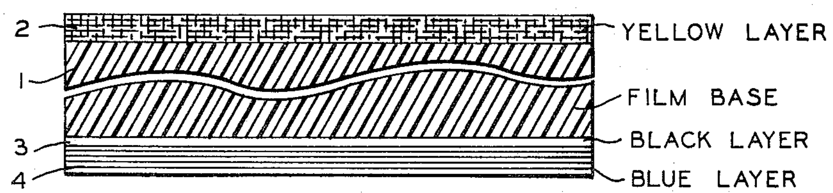
Figure 2:
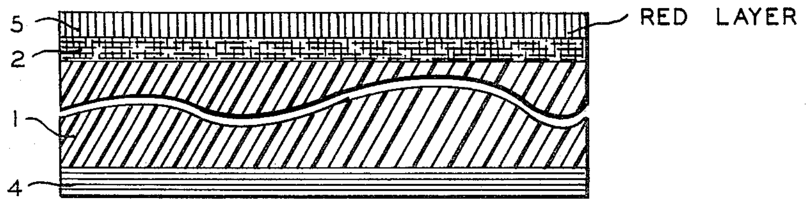
Figure 3:
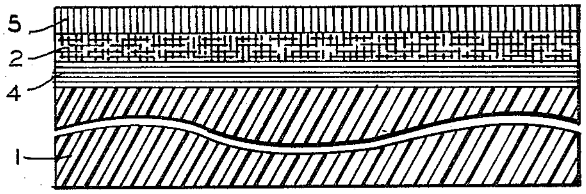
Figure 4:
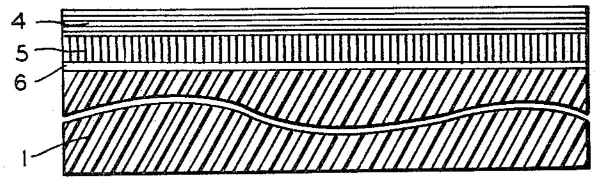

This invention relates to a process for obtaining multicolor images by photopolymerization and to a light-sensitive element for use in the process.

It has been proposed to form light-sensitive elements in which a hydrophilic monomer and a light-sensitive photopolymerization catalyst in a colloidal carrier are coated onto a base such as paper, film or the like and in which, after exposure to a suitable object, a washout operation with water or another suitable liquid removes the unpolymerized monomer from the coating whereby the polymer formed, which is insoluble in the water or other liquid used to remove the monomer, remains as an imagewise resist.

Application Serial No. 2845, filed January 18, 1960, now Patent No. 3,130,050, discloses a method of obtaining images by photopolymerization wherein oil soluble dyes or pigments (colorants) are dissolved in a suitable organic solvent and the solution thus formed is dispersed in a hydrophilic colloid containing a monomer and a polymerization catalyst. The resulting dispersion is then coated on a suitable support. Upon exposure and washing out as described above, a monolayer resist is obtained, the color of which corresponds to the color of the dye or pigment which is encapsulated in the oily droplets in the resist.

The process described in the aforementioned application is capable of producing only a single colored image and if it is desired to obtain multicolored images by such process, it is necessary to superpose a number of processed elements, each bearing a differently colored image. Such a procedure is inconvenient and uneconomical since it requires more than one coated base and the registration of the superposed coatings is time consuming and cumbersome.

There is a demand in the art such as in visual aids, overlays and color proofing to provide a multilayer sensitive element capable of yielding without optical sensitization multicolor images to produce a selected dye image of varying colors with the same multilayer material. Moreover, there is a need in signal work for such an element in which it is possible to produce differently colored images in different areas of the element. We have found that such an element which yields polymerized colored resist images can be prepared and the results previously mentioned can be achieved by intensity modulation of the printing light and while using different patterns or separation negatives in obtainig the multicolor resists.

It is an object of this invention to provide a process of obtaining multicolor images of photopolymerized material on the same base.

It is a further object of this invention to provide a process for obtaining multicolor images of photopolymerized material on an opaque base.

It is a still further object of this invention to provide a process of coating a base with a plurality of layers of photopolymerizable material, each having a different colored dye or pigment incorporated therein along with a radiation-sensitive photopolymerizable catalyst.

Another object of this invention is to provide a light-sensitive element comprising a base having thereon a plurality of superposed layers of photopolymerizable material, each layer containing a differently colored dye or pigment and each containing a radiation-sensitive photopolymerizable catalyst.

Other objects and advantages of this invention will appear to those skilled in the art from the detailed description thereof given below.

The objects and advantages of our invention are attained by coating upon a base, which may be either transparent or opaque, a plurality of layers each comprising a hydrophilic monomer containing the grouping $CH_2=C<$ and a light-sensitive photopolymerization catalyst and each containing a differently colored dye or pigment. By exposing the element thus produced to light under controlled conditions, photopolymerization of the layers is obtained. After exposure, the unpolymerized portions of the monomer are washed out thereby producing a multicolor resist on a single base.

Hydrophilic photopolymerizable monomers which we may employ are those containing the grouping $CH_2=C<$ such as acrylamide, methacrylamide, N-methylolacrylamide, N-ethanolacrylamide, vinyl pyrrolidone, methyl methacrylate, methyl acrylate, methyl vinyl ether or the like. A cross-linking agent may also be employed and for this purpose there is generally used a compound containing at least two vinyl groups such as N,N'-methyl-bis-acrylamide, divinyl benzene, triallyl cyanurate, divinyl ketone, diglycol-diacrylate or the like. It is to be noted, moreover, that the cross-linking agent may, if desired serve as the monomer. Generally, the cross-linking agent when used as such is employed in an amount ranging from 10 to 50 parts of monomer to each part of the cross-linking agent. It is understood that the greater the quantity of cross-linking agent within such range, the harder the polymer obtained.

In preparing the light-sensitive photopolymerizable material of the present invention, we may use any photopolymerization catalyst capable of converting to a polymer, a monomer containing the grouping $CH_2=C<$. Typically, we may use the silver compounds which are described in application Serial No. 715,528 filed by Steven Levinos on Feb. 17, 1958. Examples of such silver compounds are silver acetate, silver acetylide, silver benzoate and silver chloride, to name a few of the catalysts of said application.

It would also be possible to employ light-sensitive silver salt emulsions as described in application Serial No. 731,538 filed by Steven Levinos and Fritz W. H. Mueller on Apr. 28, 1958 now abandoned.

Another system which we have found to be suitable for our purposes is that described in application Serial No. 822,764, filed by Steven Levinos on June 25, 1959 now Patent No. 3,061,431. Examples of photopolymerization catalysts suggested for use in this application are the uranyl salts of formic acid, acetic acid, propionic acid, butyric acid and oxalic acid, to name just a few.

Still another method which may be resorted to is described in application Serial No. 765,958 filed by Steven Levinos on Oct. 8, 1958 now Patent No. 3,053,745. In this application, it is suggested that there be used a mixture of a silver halide and a silver compound more soluble than the halide. Typically, reference is made to a mixture of a silver halide with silver acetate, silver propionate, silver citrate, silver fluoride, silver lactate and the like.

Still another system which we have found to be effective is described in application Serial No. 765,275 filed by Steven Levinos and Fritz W. H. Mueller on Oct. 6. 1958 now Patent No. 3,050,390. This application contemplates the use as a photopolymerization catalyst of a mixture of a silver compound and an amphoteric metal oxide such as zinc oxide, titanium dioxide, zirconium dioxide and silicon dioxide.

Resort may also be had to the system described in application Serial No. 792,978, filed by the present applicant, Andre K. Schwerin, on Feb. 13, 1959 now abandoned. In this process, photopolymerization is induced by the utilization of anthraquinone sulfonic acids such as 2,7-anthraquinone-disulfonic acid, 1,8-anthraquinone-disulfonic acid or the like.

Another method of effecting photopolymerization is described in application Serial No. 783,725, filed by Helene D. Evans, Fritz W. H. Mueller and Steven Levinos on Dec. 30, 1958 now Patent No. 3,041,172. In this application, it is recommended that photopolymerization be effected with an amphoteric metal oxide such as previously mentioned, particularly when the oxide is promoted by use of salts having a cation of the group of mercury, thallium or iron; organic compounds of the group of organic carboxylic acids, salts of said acids and the like; and dyes of the class of amino fluorimes; hydroxy fluorimes and the like. A typical promoter for the amphoteric metal oxide is thallous sulfate, thallous nitrate, thallous phosphate or the like.

Another system which produces satisfactory resists is described in application Serial No. 808,882 filed by Helene D. Evans on Apr. 27, 1959. According to this system, there is employed as the photopolymerization catalyst a radiation-sensitive ferric salt which is used during processing in the presence of a percompound. Illustratively, the applicant refers to the use as the iron salt of ferric ammonium citrate and as the percompound to di-t-butyl peroxide.

Still another system which may be employed is described in application Serial No. 836,330 filed by Steven Levinos on Aug. 27, 1959 now Patent No. 3,065,160. According to this application, the photopolymerization catalyst is a sulfide, selenide or telluride of a metal such as aluminum, mercury, manganese, zinc and chromium, to mention but a few.

A very effective system is also described in application Serial No. 823,005 filed by Steven Levinos on June 26, 1959 now Patent No. 3,099,558. This application is directed to the use as the photopolymerization catalyst of a mixture of an aromatic diazonium compound and a dye which may be an azo dye, cyanine dye, ozanol dye or the like. In this application, it is recommended, for instance, in Example I, that the photopolymerization catalyst be a mixture of p-4-morpholinyl-benzenediazonium chloride and 3-allyl-5-[2-(3-ethyl-2(3)-benzoxazolylidene)ethylidene]-2-thiohydantoin.

A further technique for effecting photopolymerization is described in application Serial No. 834,630 filed by Fritz W. H. Mueller and Curt B. Roth on Aug. 19, 1959. This application recommends the use as the photopolymerization catalyst of a thallium salt such as, for example, thallous nitrate.

Finally, resort may be had to the teachings of U.S. Patent 2,875,047 which proposes the use of a photoreducible dye and a mild reducing agent as the photopolymerization catalyst.

It will be evident from this résumé with regard to the photopolymerization systems that may be employed that the particular nature of the catalyst is not critical. It is only essential that the catalyst be capable of photopolymerizing a hydrophilic monomer containing the grouping $CH_2=C<$ under white-light exposure in the presence of a colloidal binder such as gelatin, polyvinyl alcohol, carboxymethyl cellulose, casein or the like.

The ratio of the catalyst to the photopolymerization monomer will be relatively small. Thus, we have obtained satisfactory results with a quantity of catalyst equal to about $1/70{,}000$ of the weight of the monomer. Greater amounts of the catalyst may be employed, i.e., up to about 20%. It is, of course, understood that there will be an optimum amount of monomer to catalyst depending upon the particular catalyst system restored to. However, any person skilled in the art having decided upon the catalyst and the monomer can readily determine the amount which would give best results. In any case, it is to be pointed out that the particular catalyst and the quantities thereof which are employed are not critical features of the invention.

Coatings are prepared by dispersing the catalyst monomer and a dye in a hydrophilic colloid such as gelatin, PVA, casein, carboxymethyl cellulose or the like. Such coating is then applied to a suitable support, for example, filmbase or paper. After the coating is sufficiently dry, a second coating is applied on top of the first coating, this coating containing a dispersion of a dye different from the first dye. It is essential that each of the adjacent coatings should not contain any compound which would have a detrimental effect on the neighboring layer as, for example, additional hardening or softening of the colloidal binder of the layer. For this reason, in the case of hydrophilic vinyl monomers, we prefer N,N'-methylene-bis-acrylamide over acrylamide since the latter has a strong gelatin softening effect. By the use of the above technique, three differently colored layers may be coated on top of each other and differently colored washout resists may be obtained by the use of front and back exposure with a controlled exposure time.

As is well known from experiments with photosensitized bichromate gelatin coatings, only those parts of the light hardened coatings will resist a washout operation, which are attached firmly to the base. In other words, exposure of a photopolymerizable coatings on a transparent base from the backside of the support will harden first imagewise the monomer which is adjacent to the base. The same exposure given from the front side will not be able to reach the base of a double layer coating and, therefore, the image areas of the top layer, even though they may be photopolymerized, will wash away without any resist formation. However, by increasing the time of exposure from the back side or the front side beyond that necessary for photopolymerization, a hardening of the bottom as well as the top layer of the combined coating ensues and the corresponding resist will produce a mixed color obtained by the superposition of the color of each single layer.

Plastic filmbase may be coated with the photopolymerizable composition without an intermediate layer. Paper base, however, requires a normal subcoat, as, for example, one having the following composition:

| | | |
|---|---|---|
| Gelatin | g | 25 |
| Chrome alum 5% | g | 20 |
| Water | g | 975 |
| Dupanol C 25% | cc | 5 |

According to the invention, a different colored image can be obtained from one and the same sensitive element having superposed coatings on a single support through differential exposure without any optical or chemical sensitization of the corresponding photocatalysts used in the photopolymerization system. Similarly, by using different patterns or separation negatives, multicolor images can be obtained.

The exposure of separate layers in a multilayer system based on photopolymerization can be further enhanced by a control of the thickness of the separate layer, which has a light filtering effect on the adjacent layer. Furthermore, this light filtering effect may be increased by the addition of light absorbing dyes which may even produce a complete absorption of light after the passage of the light beam through a given layer. In this case, the dyes which may be dischargeable during the following washout operation may be coated by preference in a separate but adjacent layer to the light-sensitive layer, a practice known as antihalation technique in the photographic field.

In the formation of such antihalation layers, use may be made of Alkali Blue, Methyl Blue, Acid Magenta, aurin dicarboxylic acid, aurin monocarboxylic acid, hydroxycarboxy fuchsone and the dyes of U.S. Patent 2,147,112 and U.S. Patent 2,282,890. The dyes which are used for coloring the various layers on the base may be water soluble dyes having an affinity for the colloid of the layer such as one of the colloids previously mentioned, to wit, gelatin, PVA, casein and carboxymethyl cellulose.

As water soluble dyes there may be used the following dyes referred to in the indicated page of vol. 2, 2nd ed. of Colour Index:

CI Direct Blue 115 (p. 2211)
CI Direct Blue 106 (p. 2208)
CI Direct Blue 105 (p. 2207)
CI Direct Red 133 (p. 2123)
CI Direct Red 130 (p. 2122)
CI Direct Red 123 (p. 2119)
CI Direct Yellow 79 (p. 2035)
CI Direct Yellow 80 (p. 2035)
CI Direct Yellow 81 (p. 2035)

The use of water soluble dyes for coloring the various layers of the sensitive element is beneficial when the layers are applied to a plastic base such as cellulose acetate, polyester filmbase, polycarbonate filmbase or the like. In such case, the polymerizable composition may be applied to the subbed base of the film. The preparation of subs for the various film bases is known in the photographic art. Preferably, however, we use dyes or pigments which are oil soluble and dissolve these in an oily solvent which is later dispersed in the hydrophilic colloidal carrier. Such a technique prevents any diffusion of the dyes from layer to layer, thus ensuring clean, untinted backgrounds. Moreover, the oil dispersed dye will not leach out of the formed polymer during the washout operation. Consequently, no loss in over-all density will occur due to dye diffusion. As a further result, the resist will present very sharp edges and have high over-all density combined with high resolving power, especially when the average size of the oily droplets containing the dye is reduced to one micron or less. A further advantage of this procedure is the ease with which the washout operation may be carried out. The elimination of the unpolymerized parts of the exposed coating by a stream of lukewarm water is achieved in a few seconds, probably due to the presence in the coating of the organic solvents which act as plasticizers and facilitate the separation of polymerized areas from the unpolymerized areas.

There are numerous oil soluble dyes which may be incorporated in photopolymerizable hydrophilic coatings. Among these are:

Nigrosine SSB (Colour Index, 1st ed., #864)
Oil Blue A (Colour Index, vol. 2, 2nd ed., p. 2883)
Oil Blue C (Colour Index, vol. 2, 2nd ed., p. 2879)
Oil Blue GA (ibid., p. 2876)
Oil Red (ibid., p. 2844)
Oil Red O (Colour Index, 1st ed., #73)
Oil Yelow 2681 (ibid., #17)
Oil Black BT (Colour Index, 2nd ed., vol. 2, p. 2899)
Oil Yellow (ibid., p. 2818)

Furthermore, the dyes obtained by chromogenic development of lipophilic color formers are suitable for our new process and, in this connection, reference is made to the color formers described in U.S. Patents 2,369,489, 2,423,730 and 2,600,788. These color formers and the dyes produced therefrom are known in the trade as lipiphilic or oil soluble and are recommended for use when subtractively colored resists are desired.

The oil which is employed for dissolving the colorant is a substantially water insoluble, low molecular weight, organic crystalloidal material having a boiling point of above 175° C., said crystalloidal material having high solvent action for the colorant and the nature and proportions of the colorant and crystalloidal material being so chosen that particles thereof are liquid on conditions of coating.

Suitable solvents are, for example:

Trichesylphosphate
Di-butyl phthalate
2-Methoxybutyl phthalate
Phenylethyl alcohol Attention is directed to U.S. Patent 2,322,027 which lists additional oily solvents.

The oil containing the dye is then dispersed either by hand stirring or preferably in a blending machine, like a Waring Blendor, into the gelatin or gelatin substituent solution constituting part or total amount of the binder of the polymerizable coating. Ultrasonic emulsion preparation or other dispersion techniques may likewise be used.

In the acompanying self-explanatory drawing, we have illustrated a few combinations of differently colored layers on a single base which may be used in our novel process. In the drawing, FIGS. I to IV are cross-sectional views each showing a base and two or more differently colored layers thereon.

The process of forming a multicolored resist using our light sensitized photopolymerization material is easily carried out. The light sensitized material is exposed under a pattern to white light from both front and back. This is done sequentially, as will appear from Example III. Where the light passes through the pattern, photopolymerization of the light sensitized material takes place to produce a resist area. The exposed material is then subjected to the action of a hydrophilic solvent such as water, alcohol or the like for a short time to remove the unexposed, unpolymerized areas. A multicolored resist having improved characteristics is thus obtained.

The following examples illustrate our novel method. It is to be understood, however, that these examples are given by way of illustration and not by way of limitation. In Examples I to IV,, the same pattern was used.

*Example I*

An emulsion having the composition as given below was coated on one side of a clear film base and dried:

10 grams of Oil Yellow were dissolved in 50 grams of tricresylphosphate and dispersed in 250 grams of 15% aqueous gelatin solution with 20 cc. of 8% saponin in a Waring Blendor for three minutes. To this dispersion were added 30 grams of acrylamide and one gram of N,N'-methylene-bis-acrylamide dissolved in 20 grams of water, 50 grams of silver chloride emulsion (5% silver chloride) and 250 cc. of water.

A hardened gelatin layer containing one of the aforesaid antihalation dyes was then formed on the other side of said film and another emulsion of the same formulation as above except that the yellow dye was replaced with 10 grams of Oil Blue A, dissolved in 50 grams of tricresylphosphate, was coated on said gelatin layer.

The film thus produced is illustrated in FIG. I of the drawing wherein 1 is the clear film base, 2 is the yellow layer, 3 is the hardened gelatin layer containing the dischargeable antihalation dye, and 4 is the blue layer.

Exposure of the yellow layer for three minutes with a photoflood lamp (375 watts) at a distance of 12" gave a yellow relief image, when viewed by reflected light, upon washing with water at 50° C. for one minute.

Exposure of the blue layer through the back side for three minutes with the same photoflood lamp and at the above indicated distance gave a blue relief image, when viewed by reflected light, upon washing with water for one minute at 50° C.

A simultaneous exposure from front and back gives a green relief image, when viewed by transmitted light, upon washout with removal of the antihalation dye.

*Example II*

An emulsion of the following composition was formed: 10 grams of Oil Yellow 2681 were dissolved in 50 grams of di-butyl phthalate and dispersed in 250 grams of 15% gelatin containing 20 cc. of 8% saponin as a dispersing agent in a Waring Blendor for three minutes. To this dispersion were added 5 grams of N,N'-methylene-bis-acrylamide dissolved in 250 cc. of water and 100 cc. of 1 molar ferric ammonium citrate (green) solution.

This emulsion was coated on one side of a clear filmbase and dried.

Another emulsion of the same composition as above except that the 10 grams of oil soluble yellow dye were replaced by 10 grams of Oil Red O was coated on the yellow layer and dried.

A third emulsion of the same composition as the first emulsion except that the yellow dye was replaced by Oil Blue A was coated on the other side of the clear filmbase and dried.

The film thus produced is illustrated in FIG. II wherein 1 is the film base, 2 is the yellow layer, 4 is the blue layer and 5 is the red layer.

Upon exposure, as subsequently indicated, with the lamp of Example I at a distance of 30", followed by treatment of the exposed element for one minute with 1% hydrogen peroxide, followed by warm water washout, the following results were obtained:

(A) One minute through the back side (blue layer) yielded a blue relief when viewed by reflected light.

(B) Three minutes through the front side (yellow and red layers) yielded a reddish-orange relief when viewed by reflected light.

(C) Two minutes through the back side (blue layer) yielded a green relief (blue and yellow) when viewed by reflected light.

(D) Simultaneous exposure through the front and back yielded a black image when viewed by transmitted light.

*Example III*

10 grams of Oil Blue C dissolved in 50 grams of tricresyl phosphate were dispersed in 250 grams of 15% gelatin solution and 20 cc. of 8% saponin in a Waring Blendor for three minutes. To the resulting dispersion were added 5.0 grams of N,N'-methylene-bis-acrylamide dissolved in 250 cc. of water and 100 cc. of 1 molar ferric ammonium citrate (brown). The resulting emulsion was coated on a transparent support such as clear cellulose acetate base. When dry, it was overcoated with the same emulsion excepting that the blue dye was replaced by 10 grams of Oil Yellow. This coating, when dry, was overcoated with the same formulation as above excepting that the yellow dye was replaced by 10 grams of Oil Red.

The film thus produced is illustrated in FIG. III of the drawing wherein 1 is the base, 4 is the blue layer, 2 is the yellow layer and 5 is the red layer.

Upon exposure, as subsequently indicated, to a photoflood lamp at a distance of 30" followed by a treatment with hydrogen peroxide for one minute and by a warm water washout, the following results were obtained:

(A) One minute through the base yielded a blue image when viewed by reflected light.

(B) Two minutes through the base yielded a green image (blue and yellow) when viewed by reflected light.

(C) Exposure from the front and back yielded a black image (blue and yellow and red) when viewed by transmitted light.

*Example IV*

A baryta coated paper base coated with a hardened gelatin layer having the following composition:

1000 grams of 5% gelatin
10 cc. of 5% chrome alum
10 cc. of 8% saponin

This layer was then overcoated with a layer having the same composition as the layer containing the red dye of Example III and dried. The red layer was then overcoated with the blue layer of Example III except that it contained only 10 cc. of 1 molar ferric ammonium citrate (brown) instead of the 100 cc. used in Example III.

Due to the smaller ferric ammonium citrate concentration, the blue dye coating is less sensitive than the red dye coating, and the red bottom layer may be exposed to give a relief image without exposure of the blue layer. A longer exposure would give both blue and red.

The light-sensitive element produced by this example is illustrated in FIG. IV of the drawing wherein 1' is the baryta coated paper base, 6 is the hardened gelatin layer, 5 is the red layer and 4 is the blue layer.

The results obtained by exposure to a photoflood lamp at a distance of 30" followed by a treatment with 1% hydrogen peroxide for one minute and by a washout treatment with warm water are as follows:

(A) One minute exposure through the front gave a red image when viewed by reflected light.

(B) Two minutes exposure through the front gave a black image when viewed by transmitted light.

*Example V*

The procedure was the same as in Example II excepting that the front side was exposed to a pattern different from that used to expose the base side and steps (C) and (D) were omitted. In this way, there was obtained a product bearing blue and reddish-orange images.

*Example VI*

The procedure was the same as in Example II excepting that the same pattern was used for each exposure and the film was advanced stepwise after each exposure. There was thus obtained a resist print bearing in successive areas a blue resist, a reddish-orange resist, a green resist and a black resist.

Modifications of this invention will occur to persons skilled in the art. We, therefore, do not intend to be limited in the patent granted except as necessitated by the appended claims.

We claim:

1. A process of producing a multilayer resist image by photo polymerization which comprises coating a base with a plurality of up to three compositions each comprising an aqueous hydrophilic colloidal carrier, a hydrophilic photo polymerizable monomer dispersed therein, a catalytic amount of a light-sensitive photo polymermization catalyst and a colorant, and drying said coatings to form a corresponding plurality of layers, the colorant in the respective compositions and resultant layers being of different hue; photographically exposing the resulting material to light under a pattern while directing the light from such side of the material and so adjusting the intensity of the exposure as to photo polymerize at least one of the layers in contact with the base, and photographically exposing said material to light under another pattern while directing the light from such side of the base and so adjusting the intensity of the exposure as to photo polymerize a different set of said layers including one in contact with said base and washing out the non-polymerized portions of the layers.

2. The process as defined in claim 1 wherein each colorant is oil soluble and is encapsulated in a substantially water insoluble, low molecular weight, organic crystalloidal material having a boiling point above about 175° C., said crystalloidal material having a high solvent action for said colorant and said colorant and crystalloidal mabeing chosen so that particles thereof are liquid under conditions of coating.

3. A process as recited in claim 2 wherein both sensitive layers contain a cross-linking agent for said monomer.

4. A process as recited in claim 2 wherein the monomer in each layer is N,N'-methylene-bis-acrylamide.

5. A process as recited in claim 1 wherein said layers after exposure and prior to washing out are treated with a percompound and wherein the catalyst is a ferric salt.

6. The process as recited in claim 2 wherein the monomer contains the grouping $CH_2=C<$.

7. A light-sensitive element comprising a base having thereon a plurality of up to three polymerizable layers, each comprising a colloidal carrier, a hydrophilic photo polymerizable monomer dispersed therein, a catalytic amount of a light-sensitive photo polymerization catalyst and a colorant, the colorants in layers being respectively of different primary colors.

8. A light-sensitive element as recited in claim 7 wherein each colorant is oil soluble and is encapsulated in a substantially water insoluble, low molecular weight, organic crystalloidal material having a boiling point above about 175° C., said crystalloidal material having a high solvent action for said oil soluble colorant and said colorant and crystalloidal material being so chosen that particles thereof are liquid under conditions of coating.

9. A light-sensitive element as recited in claim 7 wherein said compositions also contain a cross-linking agent for said monomer.

10. A light-sensitive element as recited in claim 7 wherein said monomer is N,N'-methylene-bis-acrylamide.

11. The article as defined in claim 8 wherein the monomer possesses the grouping $CH_2=C<$.

12. A light-sensitive element comprising a base having thereon a plurality of up to three photo polymerizable layers, each comprising a colloidal carrier, a hydrophilic photo polymerizable monomer containing the group $CH_2=C<$, a catalytic amount of a light-sensitive photo polymerization catalyst and an oil soluble colorant encapsulated in a substantially water insoluble low molecular weight organic crystalloid material having a boiling point above about 175° C., said colorant and crystalloid material being so chosen that the particles thereof are liquid under conditions of coating, and the colorants in said layers being respectively of different primary colors.

13. A light-sensitive element as recited in claim 7 wherein the base is a transparent film.

14. A light-sensitive element as recited in claim 7 wherein said base is formed of opaque material.

15. A light-sensitive element as recited in claim 7 wherein said base is paper coated with a sublayer comprising hardened gelatin.

16. A light-sensitive element as recited in claim 12 wherein the colorant in the first layer is blue, in the second layer is yellow and in the third layer is red.

References Cited by the Examiner

UNITED STATES PATENTS

| | | | |
|---|---|---|---|
| Re. 18,680 | 12/1932 | Troland | 96—17 |
| 1,525,766 | 2/1925 | Capstaff | 96—35 X |
| 1,939,947 | 12/1933 | Baxter | 96—35 X |
| 1,953,175 | 4/1934 | Hebbel et al. | 96—11 X |
| 2,322,005 | 6/1943 | Fierke et al. | 96—73 X |
| 2,801,170 | 7/1957 | Vittum et al. | 96—97 |
| 2,875,047 | 2/1959 | Oster | 96—35 |
| 3,029,145 | 4/1962 | Dumers et al. | 96—115 |
| 3,097,096 | 7/1963 | Oster | 96—115 |
| 3,099,558 | 7/1963 | Levinos | 96—35 |

OTHER REFERENCES

Mees: "Theory of the Photographic Process" Macmillan, N.Y., 1954 (Revised Ed.) page 74 relied on.

NORMAN G. TORCHIN, *Primary Examiner.*

PHILIP E. MANGAN, HAROLD N. BURSTEIN, *Examiners.*